June 29, 1937.  J. E. BLOOMBERG  2,085,569
CUSHIONED SEAT
Filed May 1, 1933  2 Sheets-Sheet 1
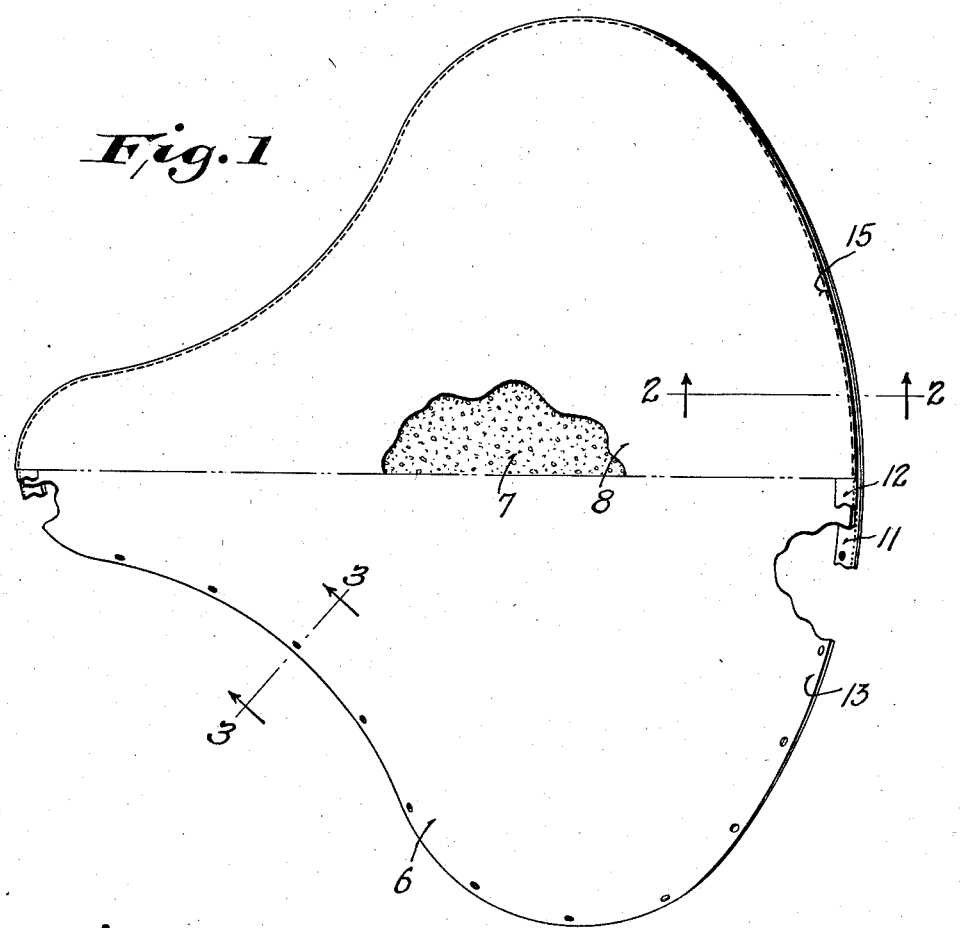
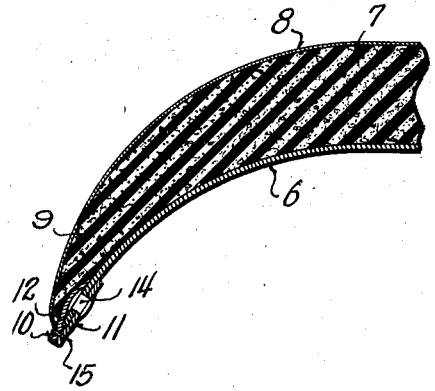
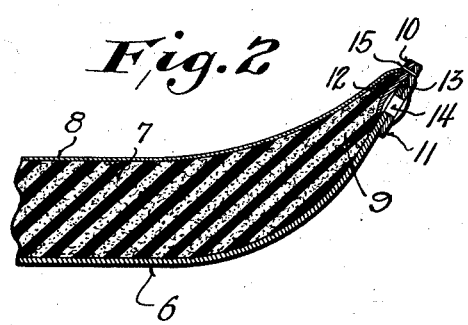
INVENTOR
Joseph E. Bloomberg
BY
Louis O. French
ATTORNEY June 29, 1937.　　　J. E. BLOOMBERG　　　2,085,569
CUSHIONED SEAT
Filed May 1, 1933　　　2 Sheets-Sheet 2

INVENTOR
Joseph E. Bloomberg
BY Louis O. French
ATTORNEY

Patented June 29, 1937

2,085,569

UNITED STATES PATENT OFFICE 2,085,569

CUSHIONED SEAT

Joseph E. Bloomberg, Milwaukee, Wis., assignor to Milwaukee Saddlery Company, Milwaukee, Wis., a corporation of Wisconsin Application May 1, 1933, Serial No. 668,734

4 Claims. (Cl. 208—15)

The invention relates to seats and more particularly to cushioned seats.

The object of the invention is to provide a cushion seat construction which may be readily applied to the metal seats used for motor-cycles, tractors and other industrial equipment. More particularly, according to the present invention an anchor strip of flexible material is fixed to the metal seat, a wear strip of flexible material is stitched to this anchor strip and also to the cushion to secure the cushion to the seat.

A further object of the invention is to provide a cushion in which a layer of sponge rubber is secured to a soft, pliable leather top or cover piece by cementing the same thereto so that the leather and the rubber act as a single piece of material.

A further object of the invention is to provide a seat cushion in which a layer of sponge rubber is secured to a leather top or cover piece by cementing the same thereto with a waterproof cement, the leather top piece having a waterproof finish on its exposed surface.

The invention further consists in the several features hereinafter set forth and more particularly defined by claims at the conclusion hereof.

In the drawings;

Fig. 1 is a plan view of a seat construction embodying the invention, parts being broken away;

Fig. 2 is a detail sectional view taken on the line 2—2 of Fig. 1;

Fig. 3 is a detail sectional view taken on the line 3—3 of Fig. 1 with the cushion applied thereto;

Figure 4:
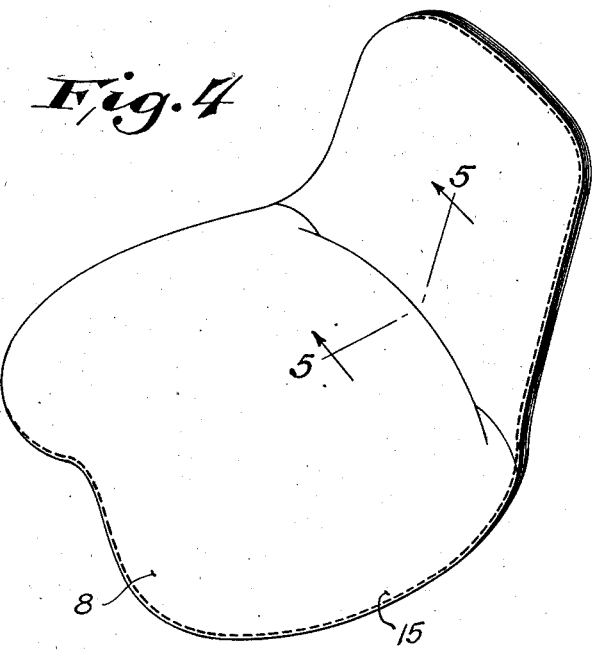
Fig. 4 is a perspective view of a seat construction embodying the invention in which the seat has a back.

Referring to Figs. 1 to 3 of the drawings, the numeral 6 designates a metal seat or seat body which may be of any suitable shape and as shown is one commonly used for motorcycles.

The cushion construction of the present invention comprises a relatively thick layer 7 of sponge rubber and a top layer or covering 8 of soft pliable leather or other suitable flexible material, the layers of material being secured together by a waterproof cement, the exposed surface of the covering 8 also having a waterproof finish. The bond between the rubber and the covering 8 is such that these parts act as a unit or single piece of material. The layer 7 is of a form to fit the metal seat to be cushioned and its outer edge portion 9 is tapered and a part 10 of the covering 8 extends beyond this tapered portion.

For securing the above described cushion construction to the metal seat 6 I provide an anchor strip 11 of flexible material and a wear strip 12 of flexible material. The anchor strip 11 preferably of suitable leather or hide is firmly secured to the edge portion 13 of the seat 6 by rivets 14. The wear strip 12 of leather or other suitable flexible material is preferably cemented or glued to the edge portion 13 of the seat 6. Both strips 11 and 12 project beyond the outer edge of the seat.

The cushion construction is secured to the seat by securing the part 10 to the extended edges of the strips 11 and 12 by stitching 15. Also it is preferred to cement the sponge rubber layer 7 to the seat and to the strip 12 which, it will be noted, extends out over the edge of the metal seat and thus protects the cushion from cutting action of this edge.

Figure 5:
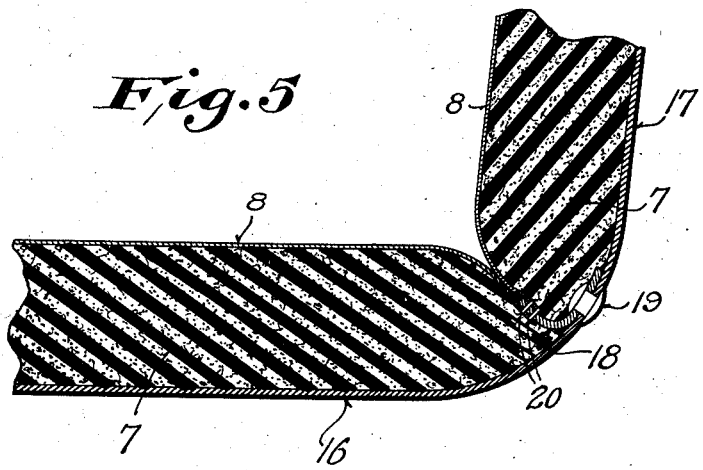
Fig. 5 is a detail sectional view taken on the line 5—5 of Fig. 4.

Where, as shown in Figs. 4 and 5, the metal seat body 16 has a back portion 17, the cushion is applied to the seat and back in the manner previously described except that in forming the joint between the seat and the back an anchor strip 18 is secured at one edge to the seat body by rivets 19 while its outer edge is secured by stitching 20 to the cover parts 8 for the seat and the back and thereafter the rubber layers 7 are put in place and the cover parts 8 then cemented to them and secured to the edge strips by the stitching 15 as in the first described construction.

With the seat construction thus formed there is no shifting of the cushion relative to the metal seat and an extremely comfortable and durable cushioned seat is provided.

I desire it to be understood that this invention is not to be limited to any particular form or arrangements of parts except in so far as such limitations are included in the claims.

What I claim as my invention is:

1. In a cushioned seat, the combination of a metal seat body having relatively sharp edges, a layer of cushioning material covering the top of said body, a top covering for said cushioning layer, an anchoring strip of flexible material secured to the underside of said seat body adjacent the edge of the latter, a wear strip of flexible material disposed adjacent the edge of the upperside of said seat body, and means securing said top covering to said strips.

2. In a cushioned seat, the combination of a metal seat body having relatively sharp edges, a layer of cushioning material covering the top of said body, a top covering for said cushioning layer, an anchoring strip of flexible material secured to the underside of said seat body adjacent the edge of the latter, means for securing said top covering to said anchoring strip, and means disposed between the seat body and said top covering for preventing wearing action of the edge of said seat body on said top covering.

3. In a cushioned seat, the combination of a metal seat body, a layer of cushioning material covering the top of said body, a top covering for said cushioning layer having its outer edge projecting beyond said body, an anchoring strip of flexible material secured to the underside of said seat body and having its outer edge projecting beyond the edge of the latter, a wear strip of flexible material disposed adjacent the edge of the upperside of said seat body and having its outer edge projecting beyond said body, and stitching securing the outer edge of said top covering to the outer edges of said wear strip and anchoring strip.

4. In a cushioned seat, the combination of a metal seat body having relatively sharp edges, a cushioning layer of sponge rubber cemented directly to said body, a top layer of soft leather for said cushioning layer having a waterproofed exposed surface and having its outer edge projecting beyond said body, a waterproof cement securing said leather to said rubber so as to act as one piece therewith, an anchoring strip of flexible material secured to the underside of said seat body and having its outer edge projecting beyond the edge of said body, a wear strip of flexible material disposed adjacent the edge of the upper side of said seat body and projecting beyond the edge of the latter, and means securing together the extended edges of said top layer, wear strip and anchoring strip.

JOSEPH E. BLOOMBERG.